United States Patent [19]

Shaw

[11] Patent Number: 4,971,287

[45] Date of Patent: Nov. 20, 1990

[54] SOLENOID OPERATED FLUSH VALVE AND FLOW CONTROL ADAPTER VALVE INSERT THEREFOR

[75] Inventor: Daniel C. Shaw, Geneva, Fla.

[73] Assignee: Bauer Industries, Inc., Orlando, Fla.

[21] Appl. No.: 442,859

[22] Filed: Nov. 28, 1989

[51] Int. Cl.$^5$ ............................................. F16K 31/40
[52] U.S. Cl. .................................. 251/30.05; 251/45; 251/129.04; 251/129.15; 251/364
[58] Field of Search ................... 251/129.15, 45, 30.05, 251/30.04, 129.04, 364, 360, 30.01; 137/15

[56] References Cited

U.S. PATENT DOCUMENTS

| | | |
|---|---|---|
| 1,985,314 | 5/1934 | Coleman . |
| 2,388,990 | 1/1945 | Nelson et al. . |
| 2,507,966 | 5/1950 | Filliung, Jr. . |
| 2,552,625 | 5/1951 | Filliung, Jr. . |
| 2,590,147 | 3/1952 | Bellamy . |
| 3,034,151 | 5/1962 | Filliung, Jr. . |
| 3,115,643 | 12/1963 | Whitney . |
| 3,371,353 | 3/1968 | Filliung . |
| 3,439,895 | 4/1969 | Marandi ............................. 251/45 X |
| 3,495,804 | 2/1970 | Muller ................................ 251/45 X |
| 3,510,814 | 5/1970 | Nordfors ...................... 251/129.15 X |
| 3,524,204 | 8/1970 | Rusnok . |
| 4,284,260 | 8/1981 | Baranoff ............................... 251/45 |
| 4,309,781 | 1/1982 | Lissau . |
| 4,611,356 | 9/1986 | Lin . |
| 4,623,118 | 11/1986 | Kumar ....................... 251/129.15 X |
| 4,667,350 | 5/1987 | Ikenaga et al. . |
| 4,793,588 | 12/1988 | Laverty, Jr. . |
| 4,796,855 | 1/1989 | Sofianek ...................... 251/129.15 |

Primary Examiner—Alan Cohan
Attorney, Agent, or Firm—Shlesinger & Myers

[57] ABSTRACT

A solenoid operated flush valve has a main flush valve body including water inlet and outlet means. The main flush valve body includes generally horizontally extending nipple means which is in fluid communication with the water inlet and outlet means. A flow control means is removably mounted within the nipple means and includes valve insert means and solenoid means in cooperative engagement with the valve insert means. The valve insert means includes first and second ends and a side. The valve insert means includes a first passageway extending axially between the first and second ends thereof and a second passageway extending between one of the first and second ends and the side of the valve insert means. The second passageway is in fluid communication with the water outlet means through the side of the valve insert means. Means cooperate with the solenoid means for selectively blocking the second passageway to thereby regulate the flow of water flushing through the flush valve.

41 Claims, 3 Drawing Sheets

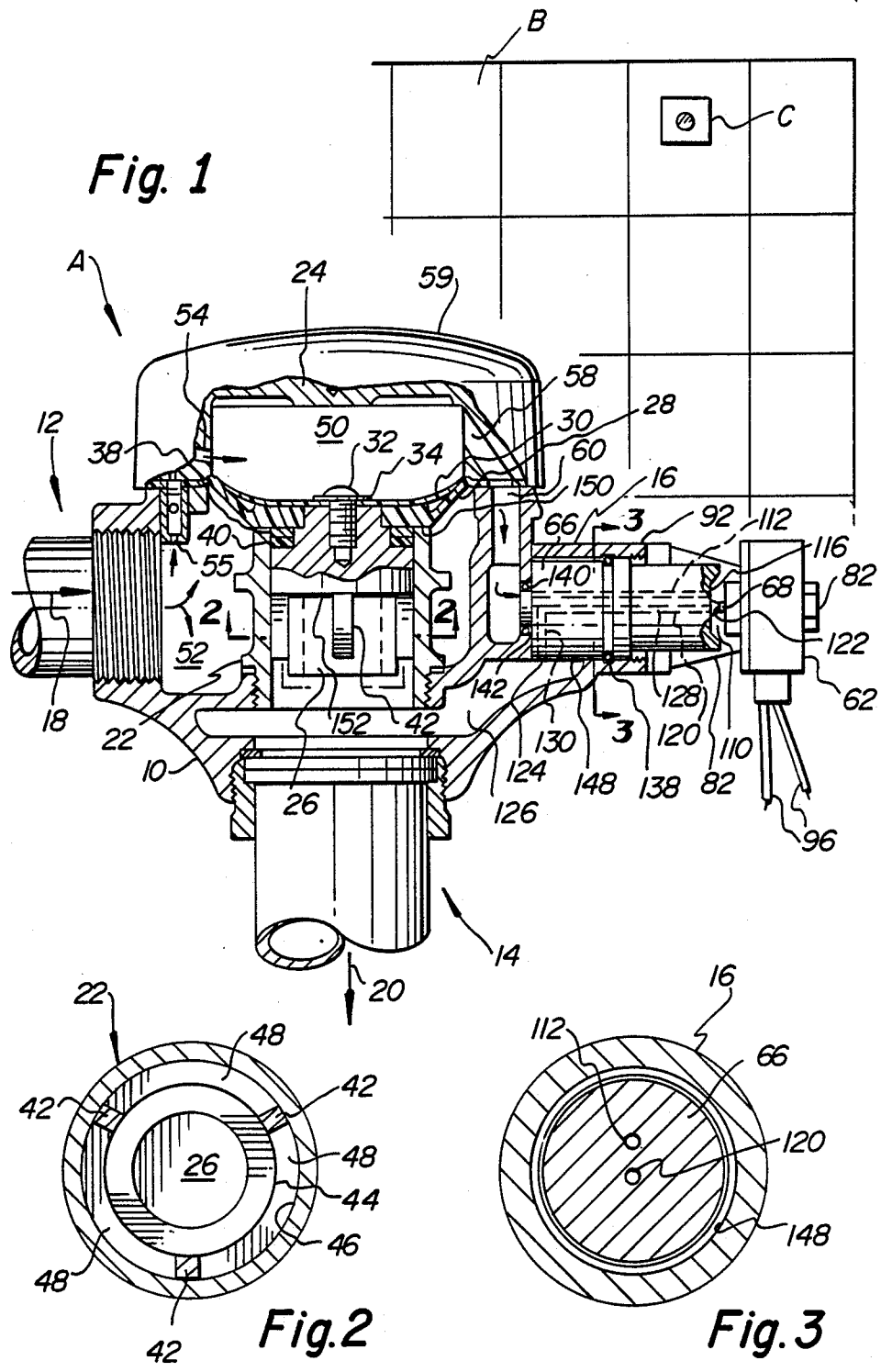

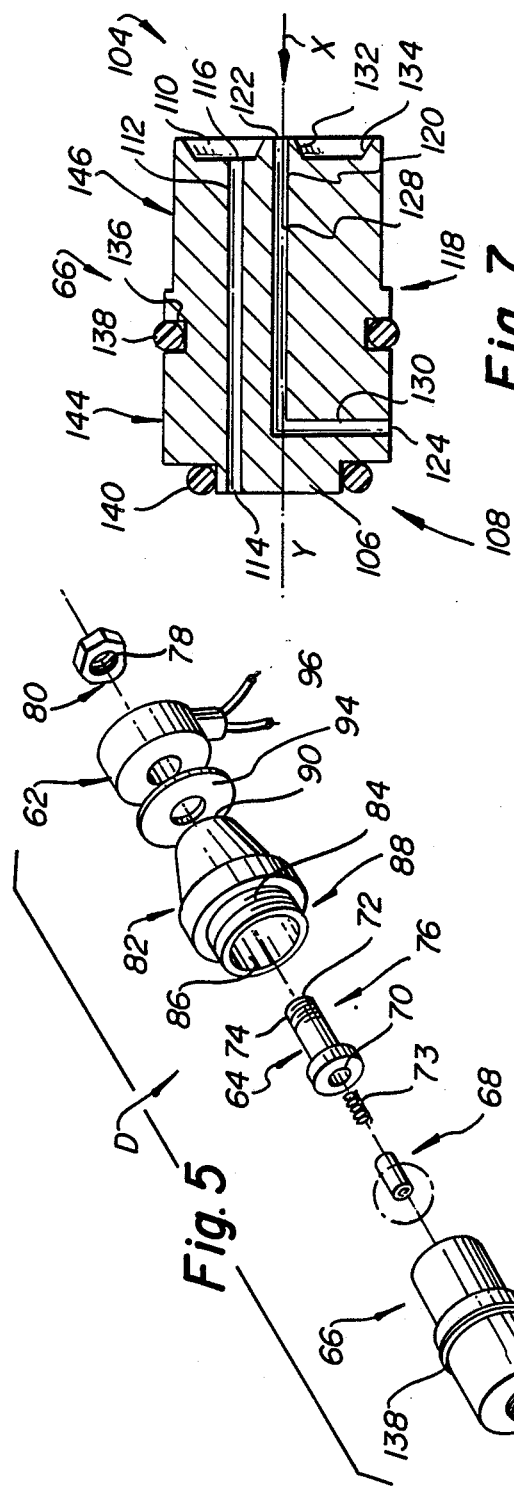

SOLENOID OPERATED FLUSH VALVE AND FLOW CONTROL ADAPTER VALVE INSERT THEREFOR

FIELD OF THE INVENTION

The present invention is directed to a lavatory flush valve, and more particularly to a solenoid operated flush valve which is automatically operated in response to an electronic sensor.

A conventional lavatory flush valve is a diaphragm-type valve which is operated by a user by actuation of an external handle. Upper and lower chambers are separated by a flexible diaphragm and are filled with water supplied by a water inlet. The water outlet is connected to a urinal or the like fixture. Fluid flow communication between the upper and lower chambers and the outlet occurs by actuation of the handle and flexing of the diaphragm. The handle may be replaced with an appropriate device for causing automatic operation of the valve.

There is a need for a solenoid operated flush valve and an easily substitutable flow control adapter valve insert therefore, which are simple in construction and easy to repair.

OBJECTS AND SUMMARY OF THE INVENTION

The principal object of the present invention is to provide a retrofit kit permitting a manually operable flush valve for automatic operation.

Another object of the present invention is to provide a flow control adapter valve insert for a solenoid operated flush valve.

Yet another object of the present invention is to provide a solenoid operated flush valve which is simple in construction and easy to repair and maintain.

A further object of the present invention is to provide a solenoid operated flow control adapter valve insert which can be easily substituted for the manually operated valve insert generally included in a conventional lavatory flush valve.

A solenoid operated flush valve has a main flush valve body including water inlet and outlet means. The main flush vale body includes generally horizontally extending nipple means which is in fluid communication with the water inlet and outlet means. A flow control means is removably mounted within the nipple means and includes valve insert means and solenoid means in cooperative engagement with the valve insert means. The valve insert means includes first and second ends and a side. The valve insert means includes a first passageway extending axially between the first and second ends thereof and a second passageway extending between one of the first and second ends and the side of the valve insert means. The second passageway is in fluid communication with the water outlet means through the side of the valve insert means. Means cooperate with the solenoid means for selectively blocking the second passageway to thereby regulate the flow of flushing water through the flush valve.

A solenoid operated flow control adapter valve insert for a flush valve has flow control means that includes valve insert means and solenoid means in cooperative engagement with the valve insert means. The valve insert means includes first and second ends and a side. The valve insert means includes a first passageway extending axially between the first and second ends thereof and a second passageway extending between one of the first and second ends and the side of the valve insert means. The solenoid means includes a reciprocable plunger which is movable therein and cooperates with and is in alignment with the valve insert means for selectively sealing the second passageway. The plunger moves away from the valve insert means when the solenoid means is activated for opening the second passageway.

The method of converting a manual flush valve to an electrically operated flush valve includes providing solenoid valve insert means having fluid inlet and fluid outlet means, a proximity sensor, and means for connecting the insert means and the sensor to a power source. The manual flush valve includes a main valve body having water inlet and outlet means, a generally horizontally extending nipple means, securement means mountable on the nipple means, and a manually operated valve insert means removably mounted in the nipple means. The method includes removing the securement means from the nipple means and then removing the manually operated valve insert means from the nipple means. The solenoid valve insert means is then inserted into the nipple means and is positioned so that the fluid inlet means extends along a first axis and the fluid outlet means extends along an axis generally transverse thereto. The securement means is repositioned on the nipple means and a proximity sensor is mounted adjacent the flush valve. The proximity sensor is electrically connected to the solenoid valve insert means.

BRIEF DESCRIPTION OF THE DRAWINGS

The above and other objects and advantages and novel features of the present invention will become apparent from the following detailed description of the preferred embodiment of the invention illustrated in the accompanying drawings, wherein:

FIG. 1 is a fragmentary elevational view partially in section of the flush valve of the invention shown mounted on a wall of a lavatory;

FIG. 2 is a cross-sectional view taken along lines 2—2 of FIG. 1, with portions omitted for clarity;

FIG. 3 is a cross-sectional view taken along lines 3—3 of FIG. 1, with portions omitted for clarity;

FIG. 5 is an exploded perspective view of the solenoid operated adapter valve insert of the invention;

FIG. 6 is an enlarged side elevational view of the portion marked within the circle in FIG. 5;

FIG. 7 is an enlarged cross-sectional view of the valve insert of FIG. 5; and

FIG. 8 is an end elevational view of the valve insert taken in the direction of arrow X in FIG. 7.

DETAILED DESCRIPTION OF THE INVENTION

Figure 4:
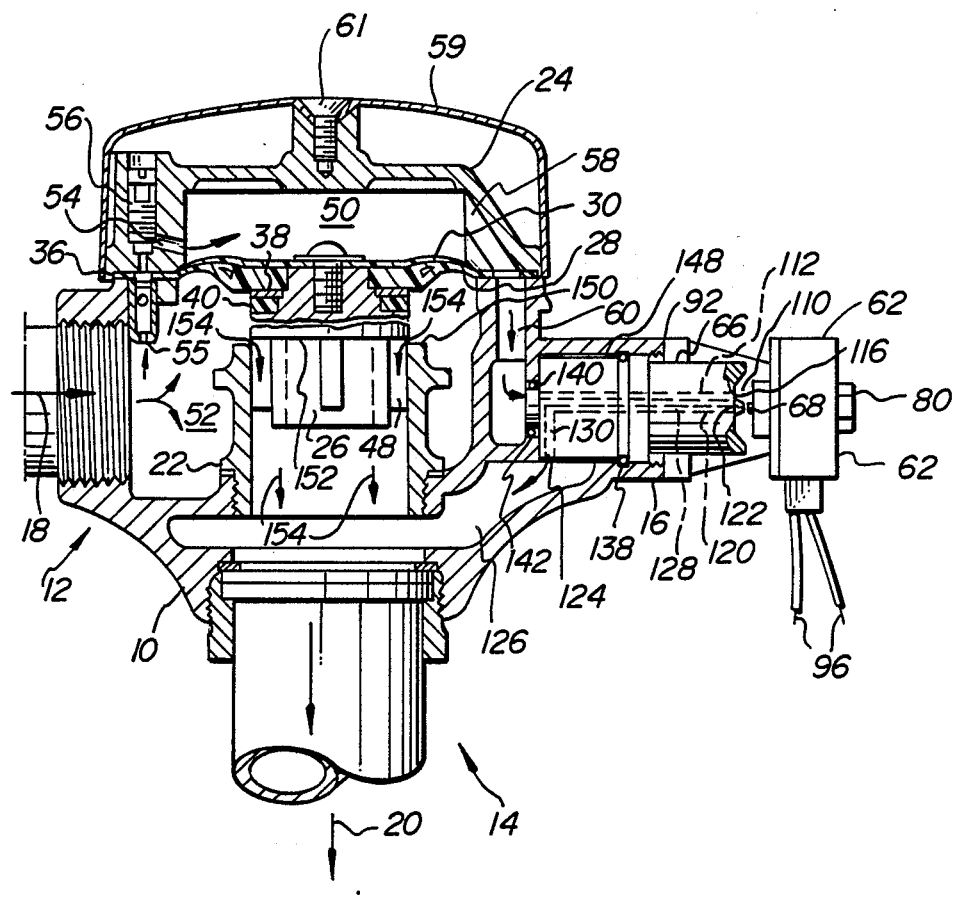
FIG. 4 is a fragmentary elevational view partially in section of the flush valve of the present invention in operation.

The flush valve A of the present invention, as best shown in FIG. 1 and 4, includes main flush valve body 10 having water inlet 12 and water outlet 14. Flush valve A is mounted to lavatory wall B, and is electrically connected to infrared sensor assembly C.

The flush valve A further includes a horizontally extending nipple 16 which is diametrically opposite water inlet 12 and extends along axis 18. Water outlet 14 extends along longitudinal axis 20 which is transverse to axis 18.

The flush valve body 10 includes a vertically extending replaceable seat 22 positioned centrally therein coaxial with water outlet 14. A cast cap 24 is disposed directly above replaceable seat 22. The replaceable seat 22 is cylindrical in shape and accommodates slidable diaphragm guide 26. A diaphragm assembly, including diaphragm 28 made of a flexible material and resilient washer 30, is mounted atop guide 26 by screw 32 and fiber gasket 34. As best shown in FIG. 4, diaphragm 28 is securely held in a water-tight manner about its peripheral edge 36 between cast cap 24 and main valve body 10. A washer 38 and silencer device 40 are disposed below diaphragm 28.

As best shown in FIGS. 1 and 2, diaphragm guide 26 is cylindrical in shape and includes three radially extending vertical ribs 42 disposed peripherally on guide body 44. Ribs 42 are equiangularly disposed about guide body 44 and abut internal wall 46 of seat 22. Ribs 42 define flow channels 48. As best shown in FIG. 1 and 4, ribs 42 and channels 48 are formed generally in the lower half portion of guide 26 such that when diaphragm 28 is seated on seat 22, no fluid communication is made between flow channels 48 and water inlet 12.

The main flush valve body 10 includes upper chamber 50 separated from lower chamber 52 by diaphragm 28. Lower chamber 52 is in fluid communication with water inlet 12, and communicates with upper chamber 50 via opening 55 of fill passageway 54. As best shown in FIG. 4, a regulating screw 56 is provided in cast cap 24 for controlling the flow of water through passageway 54. Flush passageway 58 in cast cap 24 is diametrically opposite fill passageway 54 and communicates with flush chamber 60 in main flush valve body 10. The chamber 60, as best shown in FIGS. 1 and 4, is in fluid communication with nipple 16. A cover 59 is mounted over cap 24 by a conventional screw 61.

A solenoid operated flow control adapter valve insert assembly, generally indicated as D and shown in detail in FIG. 5, is inserted in nipple 16 and is in fluid communication with chamber 60. The adapter assembly D includes electrically operated solenoid 62 with spool 64 and generally cylindrical valve insert 66. A generally cylindrical, T-shaped plunger 68 reciprocally moves within cylindrical opening 70 of spool 64. The opening 70 does not extend the length of spool 64, and is closed adjacent end face 72 of spool 64. A coil-spring 73 is biased between plunger 68 and end face 72. The spool 64 preferably is made of steel and has screw-threads 74 on end portion 76 thereof. The threads 74 engage with corresponding threads 78 in conventional nut 80. The nut 80 secures spool 64 within solenoid 62.

The adapter assembly D further includes mounting sleeve 82 with screw-threaded end 84 disposed between spool 64 and solenoid 62. The sleeve 82 defines a passageway 86 therein that extends between ends 88 and 90. The passageway 86 has a diameter greater than the diameter of insert 66, so that valve insert 66, spool 64 and plunger 68 may easily slide therein. As best shown in FIGS. 1 and 4, when adapter assembly D is mounted within nipple 16, end 84 engages corresponding screw-threaded end 92 of nipple 16 for mounting the adapter assembly D therein. In FIG. 5, reference numeral 94 designates a conventional washer that is positioned between sleeve 82 and solenoid 62. Electric cables 96 connect solenoid 62 with sensor C.

As best shown in FIG. 6, plunger 68 includes at end 98 a resilient gasket 100. Gasket 100 includes chamfered nipple 102 projecting coaxially from gasket 100. When flush valve A is not in operation, gasket 100 and nipple 102 engage end 104 of insert 66 in a water-tight manner, described below in more detail.

As best shown in FIG. 7, valve insert 66 includes projection 106 extending coaxially from end 108 and recess 110 extending inwardly from end 104 thereof. A passageway 112 extends between projection 106 and recess 110 and includes openings 114 and 116. The passageway 112 has a diameter which is uniform throughout its length. The passageway 112 is in fluid communication with flush chamber 60 via opening 114 at one end, and opens into recess 110 by opening 116 at the other end thereof. It should be noted that although passageway 112 has been shown as extending generally parallel to side 118 of insert 66, it is well within the scope of the invention to vary the orientation thereof.

A generally L-shaped passageway 120 extends between end 104 of insert 66 and side 118 thereof, and communicates with recess 110 via opening 122 at one end, and opens into base chamber 126 via opening 124 in side 118, at the other end thereof, as best shown in FIGS. 1 and 4. The passageway 120 includes let 128 which extends parallel to passageway 112, and leg 130 which extends generally transverse thereto. The passageway 120 has a diameter which is uniform throughout its length, including both legs 128 and 130. The diameter of passageway 120 corresponds with the diameter of passageway 112. As best shown in FIG. 7, leg 128 extends generally along central longitudinal axis Y of insert 66. On the other hand, passageway 112 is parallel to and spaced from axis Y, as best shown in FIG. 8. Recess 110 includes inner and outer angularly disposed perimeter surfaces 132 and 134, respectively.

As best shown in FIG. 7, a radially extending peripheral groove 136 is provided on valve insert 66 for accommodating conventional o-ring 138 therein. Another o-ring 140 is disposed around projection 106. When the adapter assembly D is mounted within nipple 16, o-ring 140 seals opening 142 in flush valve body 10 through which projection 106 extends, and prevents back flow of water from insert 66 to flush chamber 60. Likewise, o-ring 138 substantially seals and prevents back flow of water from recess 110 to chamber 60. As best shown in FIG. 7, leg 130 of passageway 120 is disposed between o-rings 138 and 140.

As best shown in FIG. 7, valve insert 66 includes larger diameter section 144 and small diameter section 146. Preferably, the length of smaller diameter section 146 is less than the length of larger diameter section 144.

As best shown in FIG. 7, leg 128 of passageway 120 runs the length of smaller diameter section 146 and a portion of the length of larger diameter section 144. The leg 130 of passageway 120, however, extends transversely thereto within larger diameter section 144. Passageway 112 extends through the length of projection 106, larger diameter section 144 and the smaller diameter section 146, but short of recess 110. Further, leg 130 of passageway 120 is disposed adjacent projection 106 and away from recess 110.

As best shown in FIG. 3, clearance 148 between nipple 16 and valve insert 66 is provided. Due to clearance 148, it is not necessary that side opening 124 of L-shaped passageway 120 be aligned with base chamber 126 when the adapter assembly D is installed in nipple 16 since, when flush valve A is activated (described below in detail), water from recess 110 will make its way to base chamber 126 through clearance 148. Therefore, clearance 148 increases the ease of installing adapter valve assembly D since one need merely insert assembly D into nipple 16 without being concerned about the alignment of leg 130 of passageway 120 with base chamber 126.

As best shown in FIG. 1 and 4, when the insert assembly D is installed in nipple 16, passageway 112 and leg 128 of passageway 120 run generally parallel to nipple 16, while leg 130 of passageway 120 runs generally transverse thereto. Recess 110 is always full of water, since passageway 112 is in constant fluid communication with flush chamber 50 and its opening 116 in recess 110. Passageway 120, on the other hand, communicates with base chamber 126 and recess 110 via openings 124 and 122, respectively. As a result, retraction of plunger 68 by energization of solenoid 62 causes the water in recess 110 to flow immediately to clearance 148. This assumes that diaphragm 28 flexes almost instantly in order to cause operation of the valve D.

USE AND OPERATION

A manually operated flush valve is converted to an electrically operated flush valve by first removing the conventional handle assembly (not shown) from its nipple 16. Then, the solenoid operated flow control adapter valve insert assembly D of the invention is inserted into the nipple 16. The assembly D is positioned in the nipple 16 so that projection 106 of insert 66 is firmly seated in opening 142 of valve body 10. As discussed above, it is not necessary that leg 130 of passageway 120 be aligned so as to open into base chamber 126. Subsequently, sleeve 82 is screwed tight on nipple 16, an nut 80 is secured tight over end 76 of spool 64. The cables 96 are then connected to sensor assembly C.

When the flush valve is not in operation, upper and lower chambers 50 and 52 are filled with water at supply line pressure. Upper chamber 50 receives water via fill passageway 54 which is in fluid communication with lower chamber 52 via opening 55. Therefore, the pressures on both sides of diaphragm 28 are the same and diaphragm 28 remains firmly seated on upper surface 150 of seat 22, since diaphragm 28 is biased into the closed position. As shown in FIG. 1, upper chamber 50 is in fluid communication with recess 110 via passageway 58, chamber 60 and passageway 112. However, opening 122 of L-shaped passageway 120 is closed because of abutting plunger 68, and any water present in recess 110 does not flow to base chamber 126 via passageway 120.

The flush valve A is rendered operative by a lavatory user stepping in front of sensor assembly C. This transmits an electrical signal to the solenoid 62 for causing operation thereof. When solenoid 62 is activated upon receiving the signal from sensor C, plunger 68 moves within spool 64 away from valve insert 66, as best shown in FIG. 4, and the water present in recess 11 begins to flow through passageway 120 into base chamber 126 and to water outlet 14.

When the water begins to flow through passageway 112 to passageway 120 via recess 110, the pressure in upper chamber 50 is reduced, thereby creating a pressure differential with lower chamber 52. The differential causes diaphragm 28 to be flexed upwardly, as best shown in FIG. 4, thereby permitting water to flow through flow channels 48 to outlet 14, as shown by arrows 154 in FIG. 4.

When solenoid 62 is deactivated, for example, by the absence of a user from the field of vision of the sensor C, plunger 68 reciprocates back to its initial blocking position due to the force exerted by spring 73. This closes opening 122 of valve insert 66. As a result, the water from chamber 60 and recess 110 stops flowing and begins to accumulate therein and in upper chamber 50. This causes the pressure in chamber 50 to rise and eventually be equalized with the pressure in lower chamber 52. Accordingly, diaphragm 28, due to the balanced pressure in upper chamber 50 and its internal bias, returns to its initial blocking position, shown in FIG. 1. The flow channels 48 are no longer in fluid communication with lower chamber 52 and, therefore, the water from chamber 52 stops flowing to outlet 14 via flow channels 48.

While this invention has been described as having a preferred design, it is understood that it is capable of further modifications, uses and/or adaptations of the invention and following in general the principle of the invention and including such departures from the present disclosure as come within known or customary practice in the art to which the present invention pertains, and as may be applied to the central features hereinbefore set forth, and fall within the scope of the invention or the limits of the claims appended hereto.

WHAT IS CLAIMED IS:

1. A solenoid operated flush valve, comprising:
   (a) a main flush valve body including water inlet and outlet means;
   (b) said main flush valve body including generally horizontally extending nipple means;
   (c) said nipple means being in fluid communication with said water inlet and outlet means.
   (d) flow control means removably mounted within said nipple means;
   (e) said flow control means including valve insert means and solenoid means in cooperating engagement with said valve insert means;
   (f) said valve insert means including first and second ends and a side;
   (g) said valve insert means including a first passageway extending axially between said first and second ends and a second passageway extending between one of said first and second ends and said side;
   (h) said second passageway being in fluid communication with said water outlet means through said side; and
   (i) means cooperating with said solenoid means for selectively blocking said second passageway and thereby regulating the flow of flushing water therethrough.

2. The flush valve of claim 1, wherein:
   (a) said valve insert means includes a coaxial projection extending from one of said first and second ends and a recess extending from the other of said first and second ends.

3. The flush valve of claim 2, wherein:
   (a) said first passageway extends through said projection and is in fluid communication with said water inlet means.

4. The flush valve of claim 1, wherein:
   (a) said solenoid means includes a reciprocable plunger movable therein; and
   (b) said plunger cooperates with and is in alignment with said valve insert means for selectively closing said second passageway.

5. The flush valve of claim 2, wherein:
(a) said recess includes an inner perimeter portion and an outer perimeter portion; and
(b) each of said inner and outer perimeter portions includes a surface extending angularly therefrom.

6. The flush valve of claim 2, wherein:
(a) said projection is of a lesser diameter then said valve insert means.

7. The flush valve of claim 2, wherein:
(a) said second passageway includes a first section extending generally parallel to said first passageway, and a second section extending generally transverse thereto.

8. The flush valve of claim 1, and including:
(a) infra-red sensor means for activating said solenoid means.

9. The flush valve of claim 1, wherein:
(a) said valve insert means is rotatable within said nipple means.

10. The flush valve of claim 7, wherein:
(a) said valve insert means includes a radially extending circumferential groove for accommodating a first o-ring therein.

11. The flush valve of claim 10, wherein:
(a) said valve insert means includes a second o-ring disposed around said projection; and
(b) said second section of said second passageway is disposed intermediate said first and second o-rings.

12. The flush valve of claim 7, wherein:
(a) said second section of said second passageway is disposed adjacent said projection and away from said recess.

13. The flush valve of claim 7, wherein:
(a) said second passageway has a uniform diameter throughout the length thereof.

14. The flush valve of claim 1, wherein:
(a) said valve insert means is disposed intermediate said main flush valve body and said solenoid means.

15. The flush valve of claim 1, wherein:
(a) said first passageway extends generally parallel to said nipple means and has a uniform diameter throughout the length thereof.

16. The flush valve of claim 7, wherein:
(a) said first section extends generally parallel to said nipple means and said second section extends generally transverse thereto.

17. The flush valve of claim 4, wherein:
(a) said solenoid means includes a generally cylindrical spool means having a recess with an open end and a closed end; and
(b) spring means disposed in said recess between said closed end and an end of said plunger.

18. The flush valve of claim 4, wherein:
(a) said plunger is generally cylindrical in shape; and
(b) said plunger includes resilient gasket means mounted on one end thereof.

19. The flush valve of claim 18, wherein:
(a) said gasket means includes a chamfered nipple extending coaxially therefrom; and
(b) said nipple has a diameter generally corresponding to the diameter of said second passageway.

20. The flush valve of claim 2, wherein:
(a) said valve insert means is generally cylindrical in shape and includes first and second sections;
(b) each of said sections has a diameter; and
(c) the diameter of said first section is slightly greater than the diameter of said second section.

21. The flush valve of claim 20, wherein:
(a) said recess is positioned about said second section.

22. The flush valve of claim 20, wherein:
(a) said projection is integral with said first section.

23. The flush valve of claim 20, wherein:
(a) each of said sections has a length; and
(b) the length of said first section is greater than the length of said second section.

24. The flush valve of claim 7, wherein:
(a) said valve insert means includes a central longitudinal axis;
(b) said first section of said second passageway extends along said axis; and
(c) said first passageway extends parallel to said central longitudinal axis.

25. A solenoid operated flow control adapter valve insert for a flush valve, comprising:
(a) flow control means including valve insert means and cooperating solenoid means;
(b) said valve insert means including first and second ends and a side;
(c) said valve insert means including a first passageway extending axially between said first and second ends, and a second passageway extending between one of said first and second ends and said side;
(d) said solenoid means including a reciprocable plunger movable therein; and
(e) said plunger cooperating with and being in alignment with said valve insert means for selectively closing said second passageway so that said plunger moves away from said valve insert means for thereby opening said second passageway when said solenoid means is activated; and
(f) means cooperating with said valve insert means for maintaining said valve insert means stationary relative to said solenoid means after the adapter insert is installed in the flush valve.

26. The adapter valve of claim 25, wherein:
(a) said valve insert means includes a projection member extending coaxially from one of said ends and a recess extending inwardly from the other of said ends.

27. The adapter valve of claim 26, wherein:
(a) said recess includes an inner perimeter portion and an outer perimeter portion; and
(b) each of said inner and outer perimeter portions includes a surface extending angularly relative to the associated end.

28. The adapter valve of claim 25, wherein:
(a) said projection member is of a lesser diameter than said valve insert means.

29. The adapter valve of claim 26, wherein:
(a) said second passageway includes a first section extending generally parallel to said first passageway, and a second section extending generally transverse thereto.

30. The flush valve of claim 29, wherein:
(a) said valve insert means includes a radially extending circumferential groove for accommodating a first o-ring therein;
(b) said valve insert means includes a second o-ring disposed around said projection; and
(c) said second section of said second passageway is disposed intermediate said first and second o-rings.

31. The flush valve of claim 29, wherein:
(a) said second section is disposed intermediate said projection and said recess.

32. The flush valve of claim 25, wherein:
(a) said second passageway is generally L-shaped and has a uniform diameter throughout the length thereof.

33. The flush valve of claim 25, wherein:
(a) said first passageway has a uniform diameter throughout the length thereof.

34. The flush valve of claim 25, wherein:
(a) said solenoid means includes a generally cylindrical spool means having a recess with an open end and a closed end; and
(b) spring means are disposed in said recess between said closed end and an associated end of said plunger.

35. The flush valve of claim 25, wherein:
(a) said plunger is generally cylindrical in shape; and
(b) said plunger includes a resilient gasket means mounted on one end thereof.

36. The flush valve of claim 35, wherein:
(a) said gasket means includes a chamfered nipple extending coaxially therefrom; and
(b) said nipple has a diameter generally corresponding to the diameter of said second passageway so that said nipple closes said second passageway when the flush valve is not in operation.

37. The flush valve of claim 25, wherein:
(a) said valve insert means is generally cylindrical in shape and includes first and second sections; and
(b) said first section has a diameter greater than the diameter of said second section.

38. The flush valve of claim 29, wherein:
(a) said valve insert means includes a central longitudinal axis;
(b) said first section of said second passageway extends along said axis; and
(c) said first passageway extends parallel to and spaced from said central longitudinal axis.

39. A method of converting a manual flush valve to an electrically operated flush valve having a solenoid valve insert means, fluid inlet and fluid outlet means, a proximity sensor, and means for connecting said valve insert means and said sensor to a power source, the manual flush valve including a main valve body having water inlet and outlet means, a generally horizontally extending nipple means, securement means mountable on said nipple means, and a manually operated valve insert means removably mounted in said nipple means, said method comprising the steps of:
(a) removing said securement means from said nipple means;
(b) removing said manually operated valve insert means from said nipple means;
(c) inserting said solenoid valve insert means into said nipple means;
(d) positioning said solenoid valve insert means within said nipple means so that said fluid inlet means is disposed on a first axis and said fluid outlet means is disposed on a second axis generally transverse to said first axis;
(e) repositioning said securement means about said nipple means;
(f) mounting a proximity sensor adjacent said flush valve; and
(g) electrically connecting said proximity sensor to said solenoid valve insert means.

40. A solenoid operated flow control adapter valve insert for a flush valve, comprising:
(a) flow control means including valve insert means and cooperating solenoid means;
(b) said valve insert means including first and second ends and a side;
(c) said valve insert means including a first passageway extending axially between said first and second ends, and a second passageway extending between one of said first and second ends and said side;
(d) said solenoid means including a reciprocable plunger movable therein;
(e) said plunger cooperating with and being in alignment with said valve insert means for selectively closing said second passageway so that said plunger moves away from said valve insert means for thereby opening said second passageway when said solenoid means is activated;
(f) said plunger being generally cylindrical in shape and including a resilient gasket means mounted on one end thereof;
(g) said gasket means including a chamfered nipple extending coaxially therefrom; and
(h) said nipple having a diameter generally corresponding to the diameter of said second passageway so that said nipple closes said second passageway when the flush valve is not in operation.

41. A valve insert for a flow control adapter valve insert assembly, comprising:
(a) a generally cylindrical valve member including first and second ends and a side;
(b) said valve member including a first passageway extending axially between said first and second ends, and a second passageway extending between one of said first and second ends and said side;
(c) said valve member including first and second sections;
(d) said first section having a diameter greater than the diameter of said second section;
(e) said first section including a radially extending circumferential groove for accommodating a first O-ring therein;
(f) said valve member including a projection member extending coaxially from one of said ends and a recess extending inwardly from the other of said ends; and
(g) a second O-ring disposed around said projection member;
(h) said valve member having a central longitudinal axis; and
(i) said first passageway extending parallel to said central longitudinal axis throughout the length thereof.

* * * * *